US012485069B2

(12) United States Patent
Pruyn

(10) Patent No.: US 12,485,069 B2
(45) Date of Patent: Dec. 2, 2025

(54) AUTOMATED MODULAR PILL DISPENSING DEVICE AND ASSOCIATED METHODS

(71) Applicant: Minott Pruyn, Belgrade, MT (US)

(72) Inventor: Minott Pruyn, Belgrade, MT (US)

( * ) Notice: Subject to any disclaimer, the term of this patent is extended or adjusted under 35 U.S.C. 154(b) by 646 days.

(21) Appl. No.: 17/809,824

(22) Filed: Jun. 29, 2022

(65) Prior Publication Data

US 2023/0000724 A1 Jan. 5, 2023

Related U.S. Application Data

(60) Provisional application No. 63/217,596, filed on Jul. 1, 2021.

(51) Int. Cl.
*A61J 7/00* (2006.01)
*A61J 1/03* (2023.01)
*A61J 7/04* (2006.01)

(52) U.S. Cl.
CPC ............... *A61J 7/0076* (2013.01); *A61J 1/03* (2013.01); *A61J 7/0418* (2015.05); *A61J 2200/70* (2013.01)

(58) Field of Classification Search
CPC .......... A61J 7/0076; A61J 1/03; A61J 7/0418; A61J 2200/70; A61J 2200/30; A61J 7/0084
See application file for complete search history.

(56) References Cited

U.S. PATENT DOCUMENTS

| | | | | | |
|---|---|---|---|---|---|
| 6,722,525 | B1 * | 4/2004 | Boyer | B65G 1/045 | 221/277 |
| 2007/0029213 | A1 * | 2/2007 | Hall | B65D 83/0454 | 206/217 |
| 2013/0110283 | A1 * | 5/2013 | Baarman | G06Q 10/087 | 700/236 |
| 2022/0013207 | A1 * | 1/2022 | Kellett | A61J 7/0084 | |
| 2022/0313558 | A1 * | 10/2022 | Duda | A61J 7/0454 | |

* cited by examiner

*Primary Examiner* — Thomas C Lee
*Assistant Examiner* — Tyler Dean Hedrick
(74) *Attorney, Agent, or Firm* — Collaborative IP; Paul Ditmyer

(57) ABSTRACT

The automated modular pill dispensing device is for selectively dispensing pills of a pill regimen to a patient. The dispensing device includes a base unit having a pill dispensing chute leading to a pill receptacle area. A plurality of stackable pill trays each include a series of pill compartments. The plurality of stackable pill trays each include communication ports for communicatively interfacing with the pill tray communication interface of the base unit and adjacent stackable pill trays above and below. Each stackable pill tray includes an opening in the tray base, aligned with the pill dispensing chute of the base unit, and an actuator configured to selectively advance the series of pill compartments towards the pill hopper in response to the controller so that pills therein will be dispensed, in accordance with the pill regimen, through the pill hopper and via the pill dispensing chute to a pill receptacle positioned at the pill receptacle area.

17 Claims, 11 Drawing Sheets

AUTOMATED MODULAR PILL DISPENSING DEVICE AND ASSOCIATED METHODS

CROSS REFERENCE TO RELATED APPLICATIONS

This application claims priority under 35 U.S.C. § 119 to provisional patent application U.S. Ser. No. 63/217,596, filed Jul. 1, 2021. The priority patent application is herein incorporated by reference in its entirety, including without limitation, the specification, claims, and abstract, as well as any figures, tables, appendices, or drawings thereof.

FIELD

The present invention relates in general to the field of medical devices, and particularly to devices, systems and methods for dispensing one or more regimens of pills to a user.

BACKGROUND

No matter how old you are, it can be easy to lose track of the last time you took your medication. One way to stay on track with any medications you need is to use a pill dispenser. These days, there are many options alongside the typical pillbox divided for days of the week. Some pill dispensers merely organize pills in clearly labeled boxes while others have special alarms to indicate that it's time to take medication or even notify you when it's time to renew your prescription.

The MedaCube Dispenser and the Hero Automatic Medication Dispenser are examples of existing technology. None of these are modular, stackable or scalable.

This background section is intended to introduce the reader to various aspects of typical technology that may be related to various aspects or embodiments of the present invention, which are described and/or claimed below. This discussion is believed to be useful in providing the reader with background information to facilitate a better understanding of the various aspects and embodiments of the present invention. Accordingly, it should be understood that these statements are to be read in light of, and not as admissions of, the prior art.

SUMMARY

With the above in mind, embodiments of the present invention are related to automating the secure dispensing of pills (e.g. medications and/or supplements) to patient according to a regimen.

This and other objects, advantages and features in accordance with the present invention may be provided by an automated modular pill dispensing device for selectively dispensing pills of a pill regimen to a patient. The dispensing device includes a base unit having a pill dispensing chute leading to a pill receptacle area, and the base unit including a controller coupled to a power source, a pill tray communication interface, and a user interface. A plurality of stackable pill trays each include a tray base and associated series of pill compartments with each configured to hold at least one pill of a treatment. The plurality of stackable pill trays are configured to stack on each other, and on the base unit, and each include communication ports for communicatively interfacing with the pill tray communication interface of the base unit and adjacent stackable pill trays above and below. Each stackable pill tray includes an opening in the tray base, aligned with the pill dispensing chute of the base unit, and an actuator configured to selectively advance the series of pill compartments towards the pill hopper in response to the controller so that pills therein will be dispensed, in accordance with the pill regimen, through the pill hopper and via the pill dispensing chute to a pill receptacle positioned at the pill receptacle area.

Additionally, and/or alternatively, the user interface comprises a display and user input panel configured to input and output pill related information.

Additionally, and/or alternatively, the user interface further includes a speaker configured to output auditory information.

Additionally, and/or alternatively, each stackable pill tray includes at least one visual indicator to communicate a status of the stackable pill tray.

Additionally, and/or alternatively, each stackable pill tray comprises a rotatable pill compartment ring above the tray base that defines the series of pill compartments. The actuator of each stackable pill compartment tray may be configured to selectively rotate the rotatable pill compartment ring so that the series of pill compartments advance towards the opening in the tray base in response to the controller.

Additionally, and/or alternatively, each stackable pill tray comprises a sensor arrangement including a pill dispensing sensor, a low-pill sensor, and an out-of-pills sensor.

Additionally, and/or alternatively, each stackable pill tray comprises an adjustable last-pill position tracker configured to indicate a position of the last pill in a pill compartment of the stackable pill tray and trigger the low-pill sensor and the out-of-pills sensor.

Additionally, and/or alternatively, each stackable pill tray comprises a locking mechanism configured to lock the stackable pill tray to one of the base unit and an adjacent stackable pill tray therebelow.

Additionally, and/or alternatively, the communication ports of each stackable pill tray comprise a top communication port for communicatively interfacing with an adjacent stackable pill tray there above, and a bottom communication port for communicatively interfacing with one of the pill tray communication interface of the base unit and an adjacent stackable pill tray therebelow.

Additionally, and/or alternatively, the dispensing device may include a pill loader accessory including a holding area configured to hold pills for a selected stackable pill tray, and a loading chute configured to align with a respective pill compartment when the pill loader accessory is manually rotated into position.

Another embodiment is directed to an automated modular pill dispensing device for selectively dispensing pills of a pill regimen to a patient. The dispensing device includes a base unit having a pill dispensing chute leading to a pill receptacle area, and the base unit including a controller coupled to a pill tray communication interface. A plurality of stackable pill trays each include a rotatable pill compartment ring above a tray base that defines a series of pill compartments with each configured to hold at least one pill of the pill regimen. The plurality of stackable pill trays are configured to stack on each other, and on the base unit, and each include at least one communication port for communicatively interfacing with the pill tray communication interface of the base unit. Each stackable pill tray includes an opening in the tray base, aligned with the pill dispensing chute of the base unit, and a motor configured to selectively rotate the rotatable pill compartment ring to advance the series of pill compartments towards the opening in response to the controller so that pills therein will be dispensed, in accordance with the pill regimen, through the opening and via the pill dispensing chute to a pill receptacle positioned at the pill receptacle area.

Additionally, and/or alternatively, the base unit further comprises a user interface including a display and user input panel configured to input and output pill related information. The user interface may further include a speaker configured to output auditory information.

Additionally, and/or alternatively, the base unit further comprises a power source.

Additionally, and/or alternatively, each stackable pill tray comprises a sensor arrangement including a pill dispensing sensor, a low-pill sensor, and an out-of-pills sensor.

Additionally, and/or alternatively, each stackable pill tray comprises an adjustable last-pill position tracker configured to indicate a position of the last pill in a pill compartment of the stackable pill tray and trigger the low-pill sensor and the out-of-pills sensor.

Additionally, and/or alternatively, each stackable pill tray comprises a locking mechanism configured to lock the stackable pill tray to one of the base unit and an adjacent stackable pill tray therebelow.

Additionally, and/or alternatively, the at least one communication port of each stackable pill tray comprises a top communication port for communicatively interfacing with an adjacent stackable pill tray there above, and a bottom communication port for communicatively interfacing with one of the pill tray communication interface of the base unit and an adjacent stackable pill tray therebelow.

Additionally, and/or alternatively, the dispensing device further includes a pill loader accessory including a holding area configured to hold pills for a selected stackable pill tray, and a loading chute configured to align with a respective pill compartment when the pill loader accessory is manually rotated into position. The base unit further may comprise a storage feature to stow the pill loader accessory.

Additionally, and/or alternatively, each stackable pill tray includes at least one visual indicator to communicate a status of the stackable pill tray The embodiments are used to dispense a variety of pill based medications in a varying number of regimens to a user. A single dosage of a mediation is inserted into each compartment by the user, for example, using a pill loading accessory. Each tray may contain a single type of medication. Individual trays are configured to dispense a medication on a set regimen. When the base unit detects that it is time for a medication of a particular regimen to be dispensed, it will activate any tray that is configured for that regimen to dispense a single dosage of that medication. When activated, a tray will advance the compartments forward by one position, causing a single dosage of medication to fall through an opening in the bottom of the tray. The opening will allow the medication to fall through the device and into a receptacle. Once all medications for a particular regimen have been dispensed, a notification may be triggered informing the user that it is time to take their medication.

BRIEF DESCRIPTION OF THE DRAWINGS

The example embodiments are best understood from the following detailed description when read with the accompanying drawing figures. In fact, the dimensions may be arbitrarily increased or decreased for clarity of discussion. Wherever applicable and practical, like reference numerals refer to like elements.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
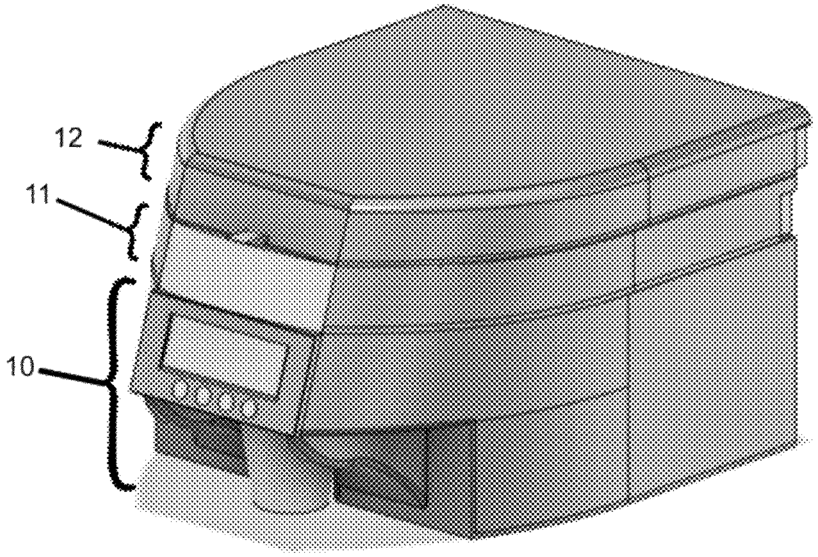
FIG. 1 is a perspective view of a complete device showing the separation of the detachable sections of the device.
Figure 2:
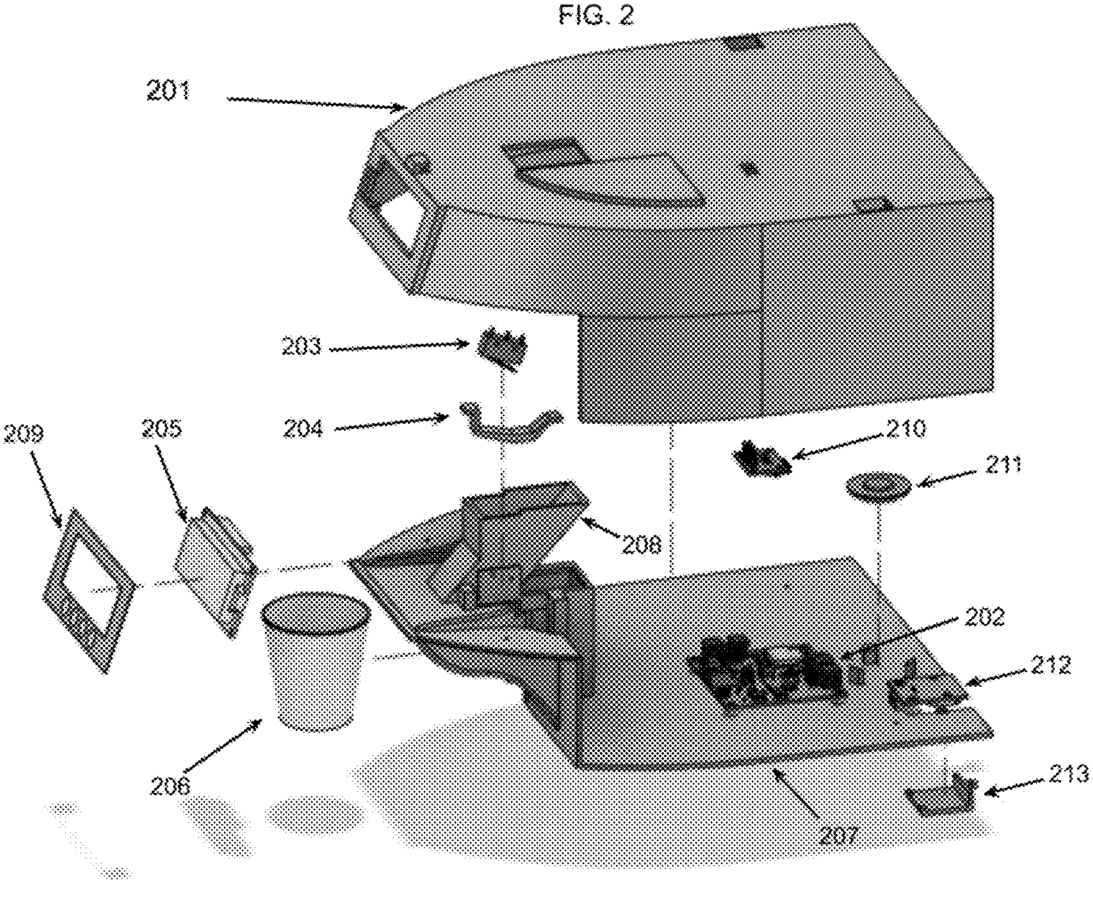
FIG. 2 is an exploded view of the base unit.
Figure 7:
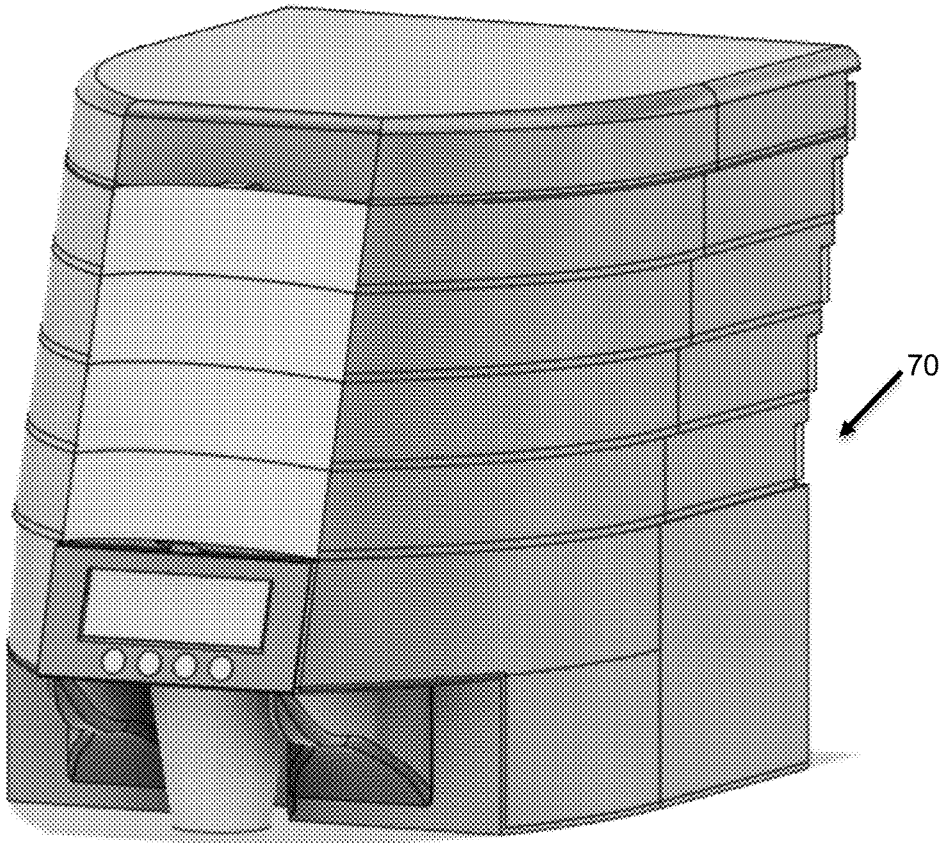
FIG. 7 is a perspective of a complete device with four modular pill trays attached.

FIG. 1 illustrates an embodiment of an entire device including a base unit 10, a single pill tray 11 and a lid 12. Additional pill trays 11 can be added as seen in the embodiment of FIG. 7, which has four pill trays stacked above each other. An embodiment of the base unit 10 is shown in FIG. 2. A controller or main processing unit 202 will control and track when pills of a certain regimen need to be dispensed. The main processing unit 202 will read the configuration of each tray and then activate the trays to dispense medication when a particular regimen is due to be dispensed. Once a tray is activated and dispenses a dosage of a medication, that medication will fall through an opening in the tray and into the base unit shaft or dispensing chute 208 and eventually fall into the waiting detachable pill receptacle 206 placed at the pill receptacle area.

A user interface 205 will let the user know when certain events have occurred, as well as allow input for configuration of the device. The base unit may also include a sensor 203 to detect if the pill receptacle 206 is in place or has been removed by the user. The user interface 205 may include a display screen to communicate information to the user. The display screen may be a touch screen display, or control buttons may be provided on a control panel 209 of the user interface 205. Audio indications to the user may be provided with a speaker 21.

A power source 212 is included, such as an AC or DC power interface and cord, and/or a battery enclosed by a cover 213. The electronic components may be connected via a communication bus. The main processing unit 202 may also include a wired or wireless communication interface to upload/download software and/or communicate with an external device such as a personal computer, network server, handheld mobile device, tablet etc. As such, a software application may be provided for use on a user device such as the personal computer or handheld mobile device.

Figure 3:
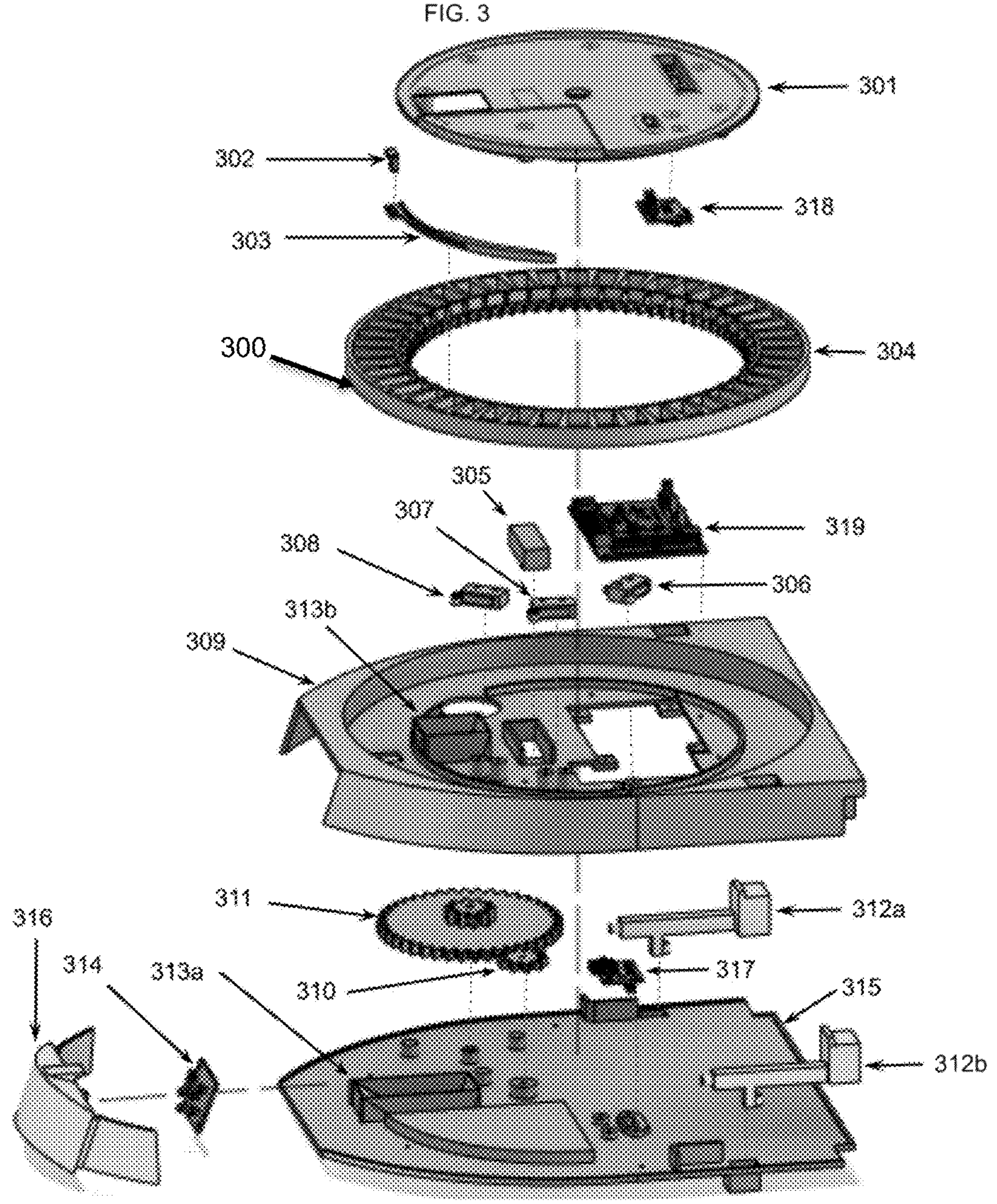
FIG. 3 is an exploded view of the modular pill trays.

FIG. 3 illustrates the internal workings of an individual pill tray 11. Individual pills are loaded into the pill compartments 304 that make up the rotatable pill compartment ring 300. When activated a motor 305 is turned on causing the pill compartment 304 to rotate the pills towards a hole in the base of the pill tray. The pills fall through the hole and into, for example, a hopper 313*a*/313*b* that funnels the pills downward through the device. A pill dispensing sensor 306 may indicate when a single pill has been dispensed and may halt the device. A pill low sensor 307 may indicate when the user is close to running out of pills in a tray. An out-of-pills sensor 308 may indicate when the pill tray is empty. A last pill position tracker 303 may be used to mark the position of the last pill in the pill tray. A locking detent or clip 302 may be included to adjust and position the last pill position tracker 303 on the ring 300. The last pill position tracker 303 may sit on top of the pill compartments 304 and will rotate with the compartments as the medication is dispensed.

There may be a visual indicator 314 (e.g. LED lights) on each tray to better inform the user of the state of individual trays. Each tray may be held together with the tray underneath it using a locking mechanism, e.g. sprint locking mechanism 312*a*/312*b* and/or a detent or hook on the cover 316. Communication between the stacked trays comes in through the bottom connection port 317, passes through the sensor board 319 and to any layers above using the top connection port 318. Additionally, individual layer settings can be set using a number of slide switches positioned on the sensor board 319.

Figure 4:
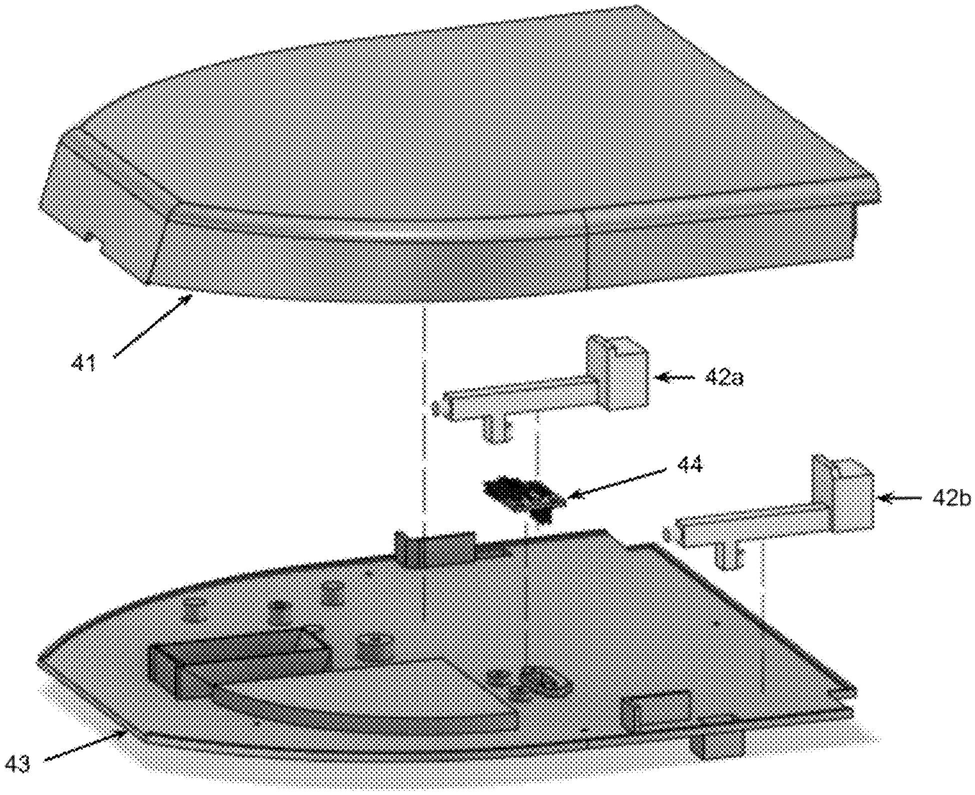
FIG. 4 is an exploded view of the cover.

FIG. 4 illustrates the lid 41 of the device. The lid is held onto the lower layers using a locking mechanism 42*a*/42*b*. A lid base 43 may carry the locking mechanism 42*a*/42*b* as well as communication port 44. When the lid is removed from the device, the controller 202 of the device will sense it and take appropriate actions, e.g. by entering a loading mode which pauses any regimen dispensing.

Figure 5:
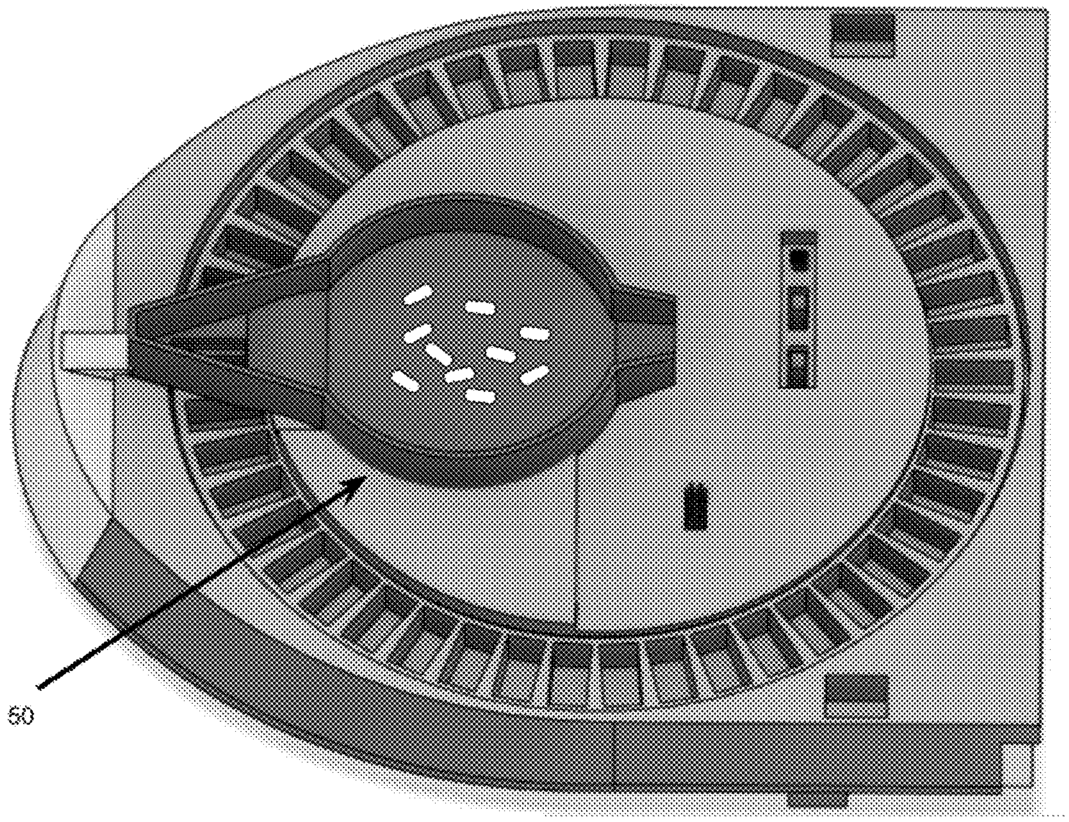
FIG. 5 is an overhead view of the pull loading accessory in position to load pills into a modular pill tray.
Figure 6:
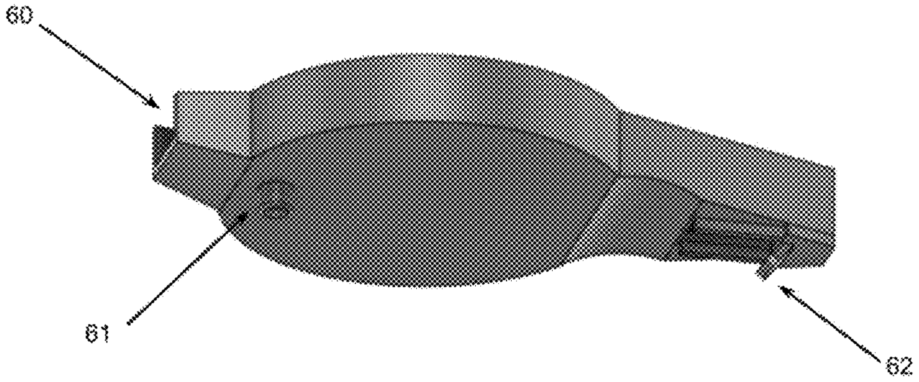
FIG. 6 is an underside view of the pill loading accessory.
Figure 8:
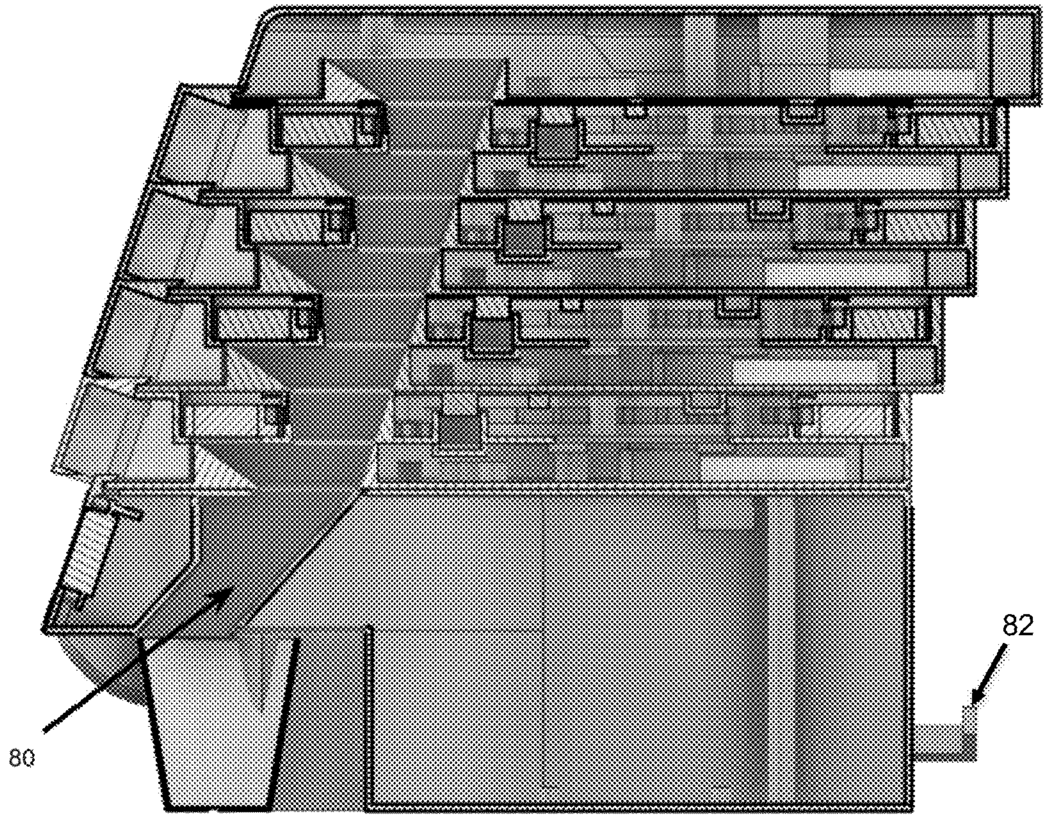
FIG. 8 is a cross sectional view of the device with four modular pill trays attached, highlighting the chamber which allows pills to fall from each layer into a central shaft.

FIG. 5 illustrates the pill loader accessory 50 sitting on top of one of the pill trays. The pill loader accessory 50 may be a separate piece and may be stowed away when not being used, e.g. at the pill loader storage feature 82 (FIG. 8). Pills are supplied into the center of the pill loader and then manually moved into position over each pill compartment by the user. FIG. 6 illustrates a plug 61 under the pill loader 50 which holds the pill loader in place allowing it to be rotated within a tray to each pill compartment as the user manually loads the pills. Extra pills can be returned to their container using the opening 60 at the back of the pill loader accessory. A flap 62 may be provided to easily align the pill loader over a particular compartment. As the pill loader 50 is rotated it will bump along the compartments making it easier to load quickly.

FIG. 7 shows a completely assembled device 70 with four modular pill trays stacked and attached to the base unit and covered by the lid. Also, the pill receptacle is in position at the receptacle area.

FIG. 8 is a cross-sectional view of the device 70 and illustrates how the offset design of the pill trays allows the pills to fall from each pill tray and into a central shaft 80 including the pill dispensing chute 208 of the base unit, and ultimately into the pill receptacle.

Figure 9:
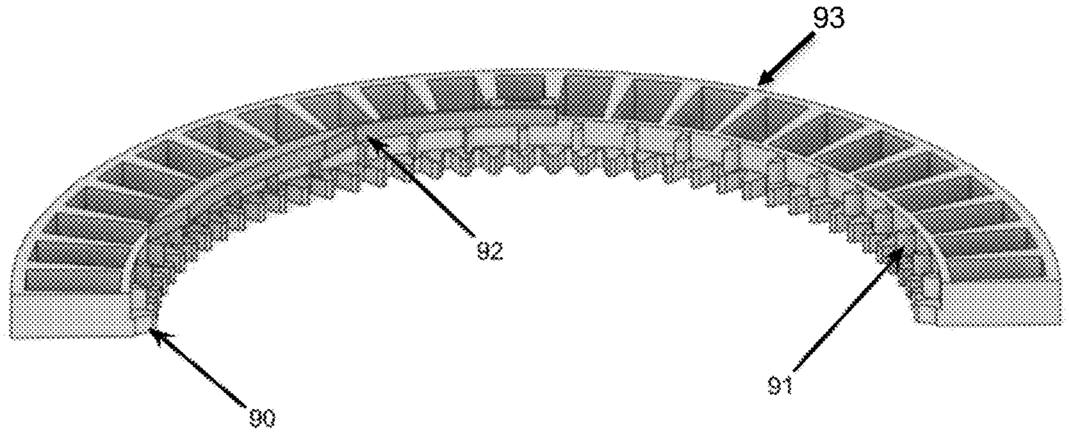
FIG. 9 is a bisected view of the pill compartments.
Figure 10:
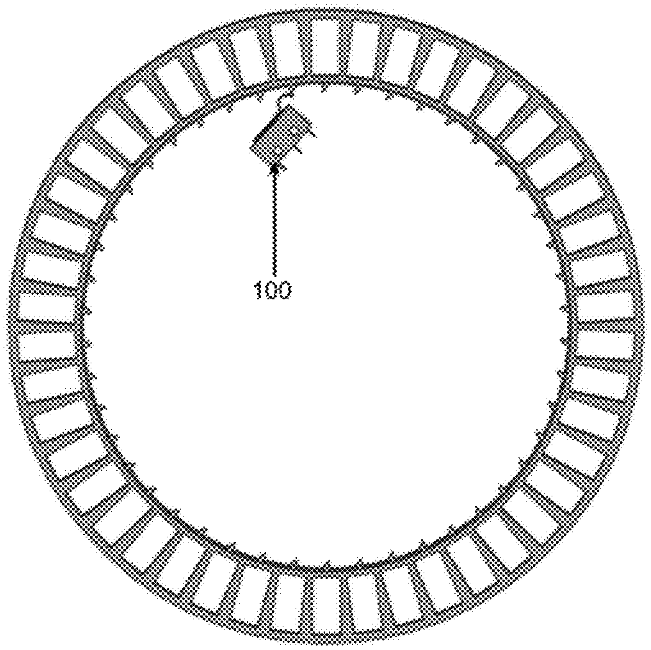
FIG. 10 is an overhead view of how the stop sensor detects when a pill has been dispensed.

FIG. 9 is a sectional view that illustrates half of the pill compartments of the pill compartment ring 93. The pill compartment ring 93 may be geared 90 to be rotated by a motor and/or gear train. There may also be a compartment indicator 91, marking the location of each pill compartment. FIG. 10 illustrates the pill dispensing sensor 100 that is triggered by the compartment indicator and can detect that a pill has been allocated. Resting on top of the compartment indicators 91 in FIG. 9 is the last pill position indicator 92, which is manually positioned by the user to indicate the position of the last pill in the pill tray after the tray is filled.

Figure 11:
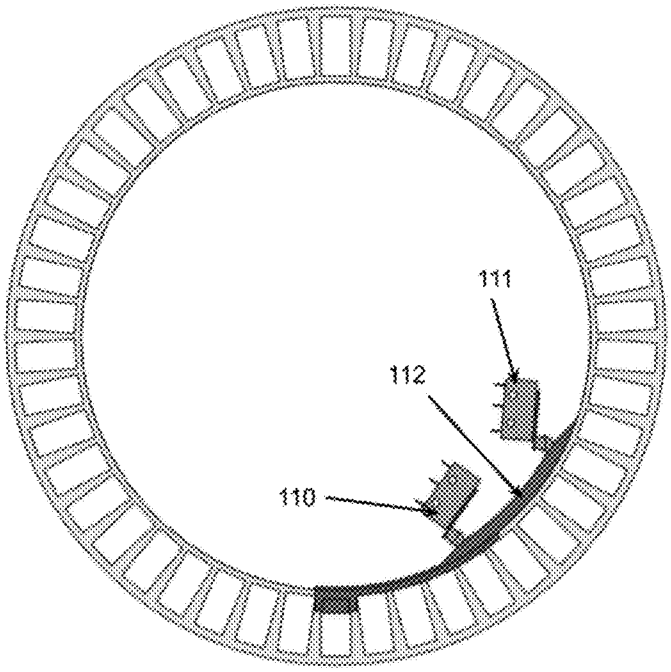
FIG. 11 is an overhead view of the low and empty sensors that may be tripped by a tray position marker.

FIG. 11 illustrates a last pill position indicator 112, that triggers both the pill low sensor 110 and the out-of-pills sensor 111. If both the pill low sensor 110 and the out-of-pills sensor 111 are triggered at the same time, an indication may be provided to the user that the pill tray is empty and will need to be refilled. The indication may be provided via the user interface 205, speaker 211, or via wireless communication to a mobile device, for example, managed by an associated software application installed thereon.

Figure 12:
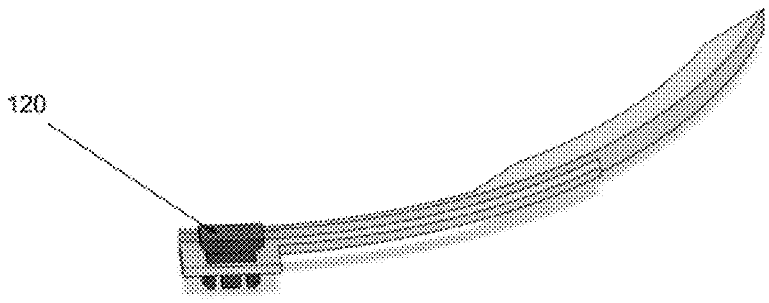
FIG. 12 is a view of the tray position marker and positioning clip.

When a user needs to refill pills, the user may start filling pills starting at the position next to the opening and fill in the opposite direction of the rotation of the pill tray. Once the tray is filled with a complete regimen, the user will lift pill clip 120 seen in FIG. 12 and advance the last pill position indicator, to the location of the last pill and then replace the pill clip.

As described above, the embodiments include various notable features. The device may provide indicators (visual and/or audio) for the following events: When the lid has been removed from the device; When the medication receptacle has been removed from the device; When the medication receptacle is replaced in the device; When it is time to take a user's medications; When a user has waited too long to take their medication; If a particular tray is running low of a medication; If a particular tray is out of medication; and If a particular tray is having issues dispensing medication; and when medication is ready to be taken.

There is a pill loader accessory which may assist the user to load a dosage of pills into each compartment of a tray. Individual pills may be loaded into individual compartments of a modular pill tray using the pill loading accessory. Each tray may be configured for the regimen for a single medication or supplement. Modular pill trays may be stacked offset to allow pills to easily fall into a centralized shaft. A last pill indicator may be positioned by the user to mark the location of the last pill in the pill compartments.

Additional features may include: A locking mechanism which will block a non-permissioned user from accessing the contents of the trays and block them from accessing configuration information; and A battery backup which will allow the device to function for a certain amount of time, even if with the loss of power. The device may be IOT enabled allowing the user or user's caretaker to monitor the state of the device and receive notifications of the following (for example): When it is time to take medication; If a medication wasn't taken; If a medication is low; If a medication has run out; If the device is having issues dispensing a medication; If the device is unplugged or in some other way not accessible.

Various computer hardware, software and firmware may be included within each component as would be appreciated by those skilled in the art. An example of the computer or processor logic will be described below.

The controller 202 and sensor board 319 may contain circuitry (e.g. on a printed circuit board) including a computer chip, or logic, that utilizes a microcontroller, memories, and a radio or wireless transceiver to operate. The logic circuitry may be referred to as an integrated circuit chip or processor which may be implemented in hardware, firmware, or a combination of hardware and software. Such a processor may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, the processor may include one or more processors capable of being programmed to perform a function. An associated memory may include a random access memory (RAM), a read only memory (ROM), and/or another type of dynamic or static storage device (e.g., a flash memory, a magnetic memory, an optical memory, etc.) that stores information and/or instructions for use by the processor.

A communication interface (e.g. associated with controller 202) may include a transceiver-like component (e.g., a transceiver, a separate receiver and transmitter, etc.) that enables the controller 202 to communicate with other devices, such as via a wired connection, a wireless connection, or a combination of wired and wireless connections. Communication interface may permit devices to receive information from another device and/or provide information to another device. For example, communication interface may include an Ethernet interface, an optical interface, a coaxial interface, an infrared interface, a radio frequency (RF) interface, a universal serial bus (USB) interface, a Wi-Fi interface, a cellular network interface, or the like.

The components may perform one or more processes described herein, for example, in response to controller 202 executing software instructions stored by a non-transitory computer-readable medium. A computer-readable medium is defined herein as a non-transitory memory device. A memory includes memory space within a single physical storage device or memory space spread across multiple physical storage devices.

Software instructions may be read into a memory from another computer-readable medium or from another device via communication interface. When executed, software instructions may cause controller 202 or processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIGS. 1-12 are provided as an example. In practice, the device or system may include additional components, fewer components, different components, or differently arranged components than those shown. Additionally, or alternatively, a set of components (e.g., one or more components) may perform one or more functions described as being performed by another set of components.

In the controller 202 the logic circuitry may drive a display screen, manage battery life, and manage the wired/wireless communication. The logic circuitry may drive a navigational menu that may be displayed on the display of the user interface. This menu, and associated control buttons or touch screen, may control all operational and transmission functions of the device.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

As may be used herein, the terms "substantially" and "approximately" provides an industry-accepted tolerance for its corresponding term and/or relativity between items. Such an industry-accepted tolerance ranges from less than one percent to fifty percent. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module). As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship.

As may also be used herein, the terms "processor", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Thus, the scope of the invention should be determined by the appended claims and their legal equivalents, and not by the examples given.

The invention claimed is:

1. An automated modular pill dispensing device for selectively dispensing pills of a pill regimen to a patient, the dispensing device comprising:

a base unit having a pill dispensing chute leading to a pill receptacle area, the base unit including a controller coupled to a power source, a pill tray communication interface, and a user interface; and a plurality of stackable pill trays each including a tray base and associated series of pill compartments each configured to hold at least one pill of a treatment;

the plurality of stackable pill trays are configured to stack on each other, and on the base unit, and each include communication ports for communicatively interfacing with the pill tray communication interface of the base unit and adjacent stackable pill trays above and below;

each stackable pill tray includes an opening in the tray base, aligned with the pill dispensing chute of the base unit, and an actuator configured to selectively advance the series of pill compartments towards the pill hopper in response to the controller so that pills therein will be dispensed, in accordance with the pill regimen, through the opening and via the pill dispensing chute to a pill receptacle positioned at the pill receptacle area;

wherein each stackable pill tray comprises a rotatable pill compartment ring above the tray base that defines the series of pill compartments;

wherein the actuator of each stackable pill compartment tray is configured to selectively rotate the rotatable pill compartment ring so that the series of pill compartments advance towards the opening in the tray base in response to the controller; and wherein each stackable pill tray comprises a sensor arrangement including a pill dispensing sensor, a low-pill sensor, and an out-of-pills sensor.

2. The automated modular pill dispensing device according to claim 1, wherein the user interface comprises a display and user input panel configured to input and output pill related information.

3. The automated modular pill dispensing device according to claim 2, wherein the user interface further includes a speaker configured to output auditory information.

4. The automated modular pill dispensing device according to claim 1, wherein each stackable pill tray includes at least one visual indicator to communicate a status of the stackable pill tray.

5. The automated modular pill dispensing device according to claim 1, wherein each stackable pill tray comprises an adjustable last-pill position tracker configured to indicate a position of the last pill in a pill compartment of the stackable pill tray and trigger the low-pill sensor and the out-of-pills sensor.

6. The automated modular pill dispensing device according to claim 1, wherein each stackable pill tray comprises a locking mechanism configured to lock the stackable pill tray to one of the base unit and an adjacent stackable pill tray therebelow.

7. The automated modular pill dispensing device according to claim 1, wherein the communication ports of each stackable pill tray comprise a top communication port for communicatively interfacing with an adjacent stackable pill tray there above, and a bottom communication port for communicatively interfacing with one of the pill tray communication interface of the base unit and an adjacent stackable pill tray therebelow.

8. The automated modular pill dispensing device according to claim 1, further comprising a pill loader accessory including a holding area configured to hold pills for a selected stackable pill tray, and a loading chute configured to align with a respective pill compartment when the pill loader accessory is manually rotated into position.

9. An automated modular pill dispensing device for selectively dispensing pills of a pill regimen to a patient, the dispensing device comprising:

a base unit having a pill dispensing chute leading to a pill receptacle area, the base unit including a controller coupled to a pill tray communication interface; and a plurality of stackable pill trays each including a rotatable pill compartment ring above a tray base that defines a series of pill compartments each configured to hold at least one pill of the pill regimen;

the plurality of stackable pill trays are configured to stack on each other, and on the base unit, and each include at least one communication port for communicatively interfacing with the pill tray communication interface of the base unit;

each stackable pill tray includes an opening in the tray base, aligned with the pill dispensing chute of the base unit, and a motor configured to selectively rotate the rotatable pill compartment ring to advance the series of pill compartments towards the opening in response to the controller so that pills therein will be dispensed, in accordance with the pill regimen, through the opening and via the pill dispensing chute to a pill receptacle positioned at the pill receptacle area;

wherein each stackable pill tray comprises a sensor arrangement including a pill dispensing sensor, a low-pill sensor, and an out-of-pills sensor.

10. The automated modular pill dispensing device according to claim 9, wherein the base unit further comprises a user interface including a display and user input panel configured to input and output pill related information.

11. The automated modular pill dispensing device according to claim 10, wherein the user interface further includes a speaker configured to output auditory information.

12. The automated modular pill dispensing device according to claim 9, wherein the base unit further comprises a power source.

13. The automated modular pill dispensing device according to claim 9, wherein each stackable pill tray comprises an adjustable last-pill position tracker configured to indicate a position of the last pill in a pill compartment of the stackable pill tray and trigger the low-pill sensor and the out-of-pills sensor.

14. The automated modular pill dispensing device according to claim 9, wherein each stackable pill tray comprises a locking mechanism configured to lock the stackable pill tray to one of the base unit and an adjacent stackable pill tray therebelow.

15. The automated modular pill dispensing device according to claim 9, wherein the at least one communication port of each stackable pill tray comprises a top communication port for communicatively interfacing with an adjacent stackable pill tray there above, and a bottom communication port for communicatively interfacing with one of the pill tray communication interface of the base unit and an adjacent stackable pill tray therebelow.

16. The automated modular pill dispensing device according to claim 9, further comprising a pill loader accessory including a holding area configured to hold pills for a selected stackable pill tray, and a loading chute configured to align with a respective pill compartment when the pill loader accessory is manually rotated into position; and wherein the base unit further comprises a storage feature to stow the pill loader accessory.

17. The automated modular pill dispensing device according to claim 9, wherein each stackable pill tray includes at least one visual indicator to communicate a status of the stackable pill tray.

* * * * *